(12) United States Patent
Cripe et al.

(10) Patent No.: US 6,587,555 B1
(45) Date of Patent: Jul. 1, 2003

(54) VIRTUAL PBX

(75) Inventors: Daniel E. Cripe, Atlanta, GA (US); Charles McDonough, Sanibel, FL (US); Gregory P. Newton, Dunwoody, GA (US)

(73) Assignee: Z-Tel Technologies, Inc., Tampa, FL (US)

( * ) Notice: Subject to any disclaimer, the term of this patent is extended or adjusted under 35 U.S.C. 154(b) by 0 days.

(21) Appl. No.: 09/666,413

(22) Filed: Sep. 20, 2000

(51) Int. Cl.⁷ .................................................. H04M 3/42
(52) U.S. Cl. .............................. 379/211.02; 379/214.01
(58) Field of Search ...................... 379/67.1, 70, 88.18, 379/90.01, 93.01, 156, 157, 158, 164, 165, 167.01, 167.08, 171, 172, 201.01, 201.02, 211.01, 211.02, 212.01, 213.01, 214.01, 218.01

(56) References Cited

U.S. PATENT DOCUMENTS

| | | | |
|---|---|---|---|
| 4,764,919 A | | 8/1988 | Hunter et al. .................. 370/60 |
| 5,375,161 A | * | 12/1994 | Fuller et al. ........... 379/142.01 |
| 5,454,032 A | | 9/1995 | Pinard et al. ................ 379/167 |
| 5,724,411 A | * | 3/1998 | Eisdorfer et al. ...... 379/211.03 |
| 5,754,630 A | * | 5/1998 | Srinivasan ............. 379/211.03 |
| 5,930,338 A | * | 7/1999 | McKendry et al. ...... 379/88.25 |
| 5,978,451 A | * | 11/1999 | Swan et al. ............... 379/88.24 |
| 6,125,176 A | * | 9/2000 | Foladare et al. ........ 379/211.02 |

FOREIGN PATENT DOCUMENTS

WO     WO 94/27394    * 11/1994

* cited by examiner

Primary Examiner—Scott L. Weaver
(74) Attorney, Agent, or Firm—Kenyon & Kenyon

(57) ABSTRACT

The invention provides a virtual private branch exchange (VPBX) that allows a plurality of individuals to be associated with a single telephone number. In one possible embodiment, when a call is received, the VPBX retrieves the customer's profile based on the called number. The profile includes a list of individuals associated with the called number, there are extension number, and any instructions concerning their personal communication requirements. A menu is then presented to the caller based on the called number's profile. The caller is given a plurality of choices, such as to choose to contact a particular individual, device, or service, such as an individual's extension, a common voice mail system, or an administrative person, such as a receptionist. If the caller chooses to be routed to a VPBX extension, the call is routed to the called party and the VPBX monitors whether the call is answered. If the party answers, the VBPX connects the call. If the called party does not answer, the VPBX checks the called party's profile for other instructions, such as whether the called party desires that the caller be routed to voice mail, that the system activate a Find-me system, etc.

29 Claims, 6 Drawing Sheets

Jones Household vPBX     500

Phone numbers:
(202) 220-4200
(202) 220-4345

| Names | Extension | PCC Configuration | " |
|---|---|---|---|
| | 510 | 520 | 530 |
| Matthew | 1 | Forward calls to pager; voicemail is off | " |
| Megan | 2 | Find me off; voice-mail is on | " |
| " | " | " | " |
| | | | |
| | | | |

Jones Household vPBX 500

Phone numbers:
(202) 220-4200
(202) 220-4345
510

| Names | Extension 520 | PCC Configuration 530 | |
|---|---|---|---|
| Matthew | 1 | Forward calls to pager; voicemail is off | " |
| Megan | 2 | Find me off; voice-mail is on | " |
| " | " | " | " |

Fig. 5

VIRTUAL PBX

TECHNICAL FIELD

The invention relates to a virtual private branch exchange (VPBX) for use in conjunction with communication networks.

BACKGROUND OF THE INVENTION

The widespread use of telecommunication systems in the past several years has created an abundance of personal requirements for individual customers. Each individual has his or her own personal requirements and preferences for a variety of communication service. However, in situations such as small offices and the household environment, multiple people often share a single telephone number. In this situation, the individual must accept only the telecommunication services provided to the group despite their individual needs.

Many small offices and households attempt to resolve such problems using additional hardware, such as additional telephone lines. However, additional telephone lines are expensive to add and maintain. For many small businesses and homes, such hardware is cost prohibitive. Furthermore, relatives, customers, etc. have the difficult task of keeping track of several numbers for the same business or household.

SUMMARY OF THE INVENTION

The invention provides a virtual private branch exchange (VPBX) that allows a plurality of individuals to be associated with a single telephone number. In one possible embodiment, when a call is received, the VPBX retrieves the customer's profile based on the called number. The profile includes a list of individuals associated with the called number, their extension number, and any instructions concerning their personal communication requirements.

A menu is then presented to the caller based on the called number's profile. The caller is given a plurality of choices, such as to choose to contact a particular individual, device, or service, such as an individual's extension, a common voice mail system, or an administrative person, such as a receptionist. If the caller chooses to be routed to a VPBX extension, the call is routed to the called party and the VPBX monitors whether the call is answered. If the party answers, the VBPX connects the call. If the called party does not answer, the VPBX checks the called party's profile for other instructions, such as whether the called party desires that the caller be routed to voice mail, that the system activate a Find-me system, etc.

BRIEF DESCRIPTION OF THE DRAWINGS

The preferred embodiments of the invention will be described in detail with reference to the following figures wherein:

FIG. 5 is an exemplary household profile; and

DETAILED DESCRIPTION OF THE PREFERRED EMBODIMENTS

Figure 1:
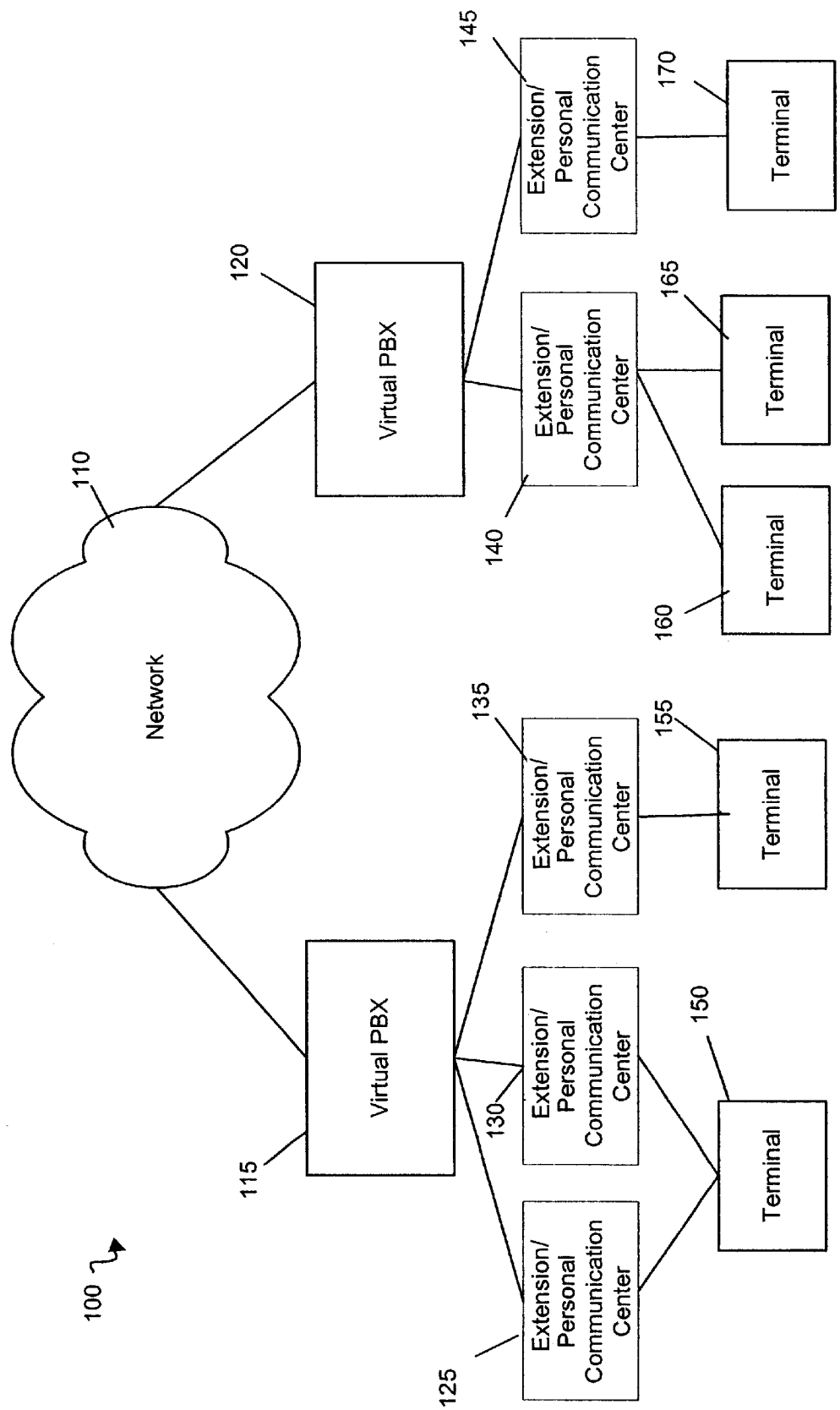
FIG. 1 is a block diagram of an exemplary VPBX system.

FIG. 1 illustrates an exemplary virtual private branch exchange (VPBX) system 100. The VPBX system 100 includes VPBXs 115 and 120 coupled to network 110. As shown in the figure, the VPBXs 115 and 120 may be connected to several extension/personal communications centers (PCCs) 125, 130, 135, 140, and 145. The PCCs 125, 130, 135, 140, 145 can lead to people, devices, services, etc., via or even other VPBXs.

The PCCs 25, 130, 135, 140, and 145 may be linked to one or more terminals. For example, PCCs 125 and 130 are linked to the same terminal 150. On the other hand, PCC 140 is linked to two separate terminals 160 and 165.

Communication signals from the terminals 150, 155, 160, 165 and 170 are sent and received by the network 110 to the VPBXs 115 and 120 and the PCC's 125, 130, 135, 140, and 145 by way of, for example, routers and switches (not shown) to a destination terminal. The communication signal routing may be performed by switches, such as the Lucent Technologies, Inc. 5ESS and 4ESS switches, for example, which are generally known in the art.

Figure 2:
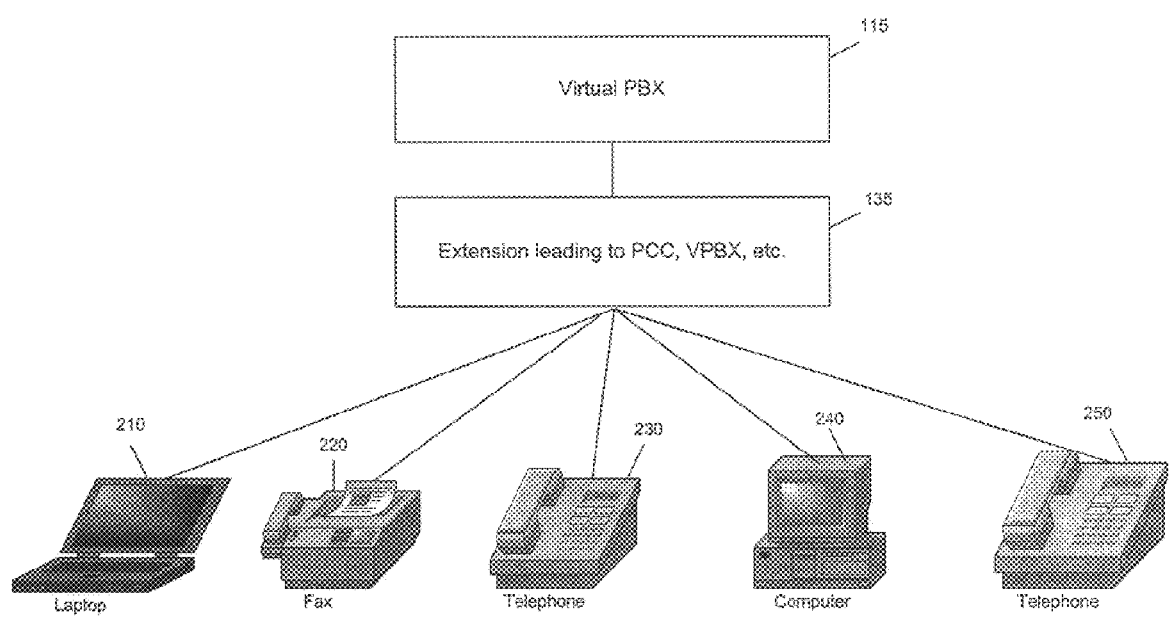
FIG. 2 is a diagram illustrating a VPBX connected to an extension.

As shown in FIG. 2, the VPBX 115 and the PCC 135 may be connected to one or more terminals 155 may represent any communication device or multiple communication devices that can send or receive communications, such as telephones 230, 250, a personal computer (PC) 240, a cellular phone, a facsimile machine 220, a portable communication device, a laptop computer 210, a pager, etc. The terminals 150, 155, 160, 165 and 170 may be tied to one individual or multiple users, such as in a household or office environment.

The network 110 may be a single network, or a plurality of networks of the same or different types. For example, the network 110 may include a local telephone network in conjunction with a long distance network. Further, the network 110 may be a data network or a telecommunications network in conjunction with a data network. Any combination of telecommunications and data networks may be used without departing from spirit and scope of the present invention. For purposes of discussion, it will be assumed that the network 110 is a single telecommunications network.

Figure 3:
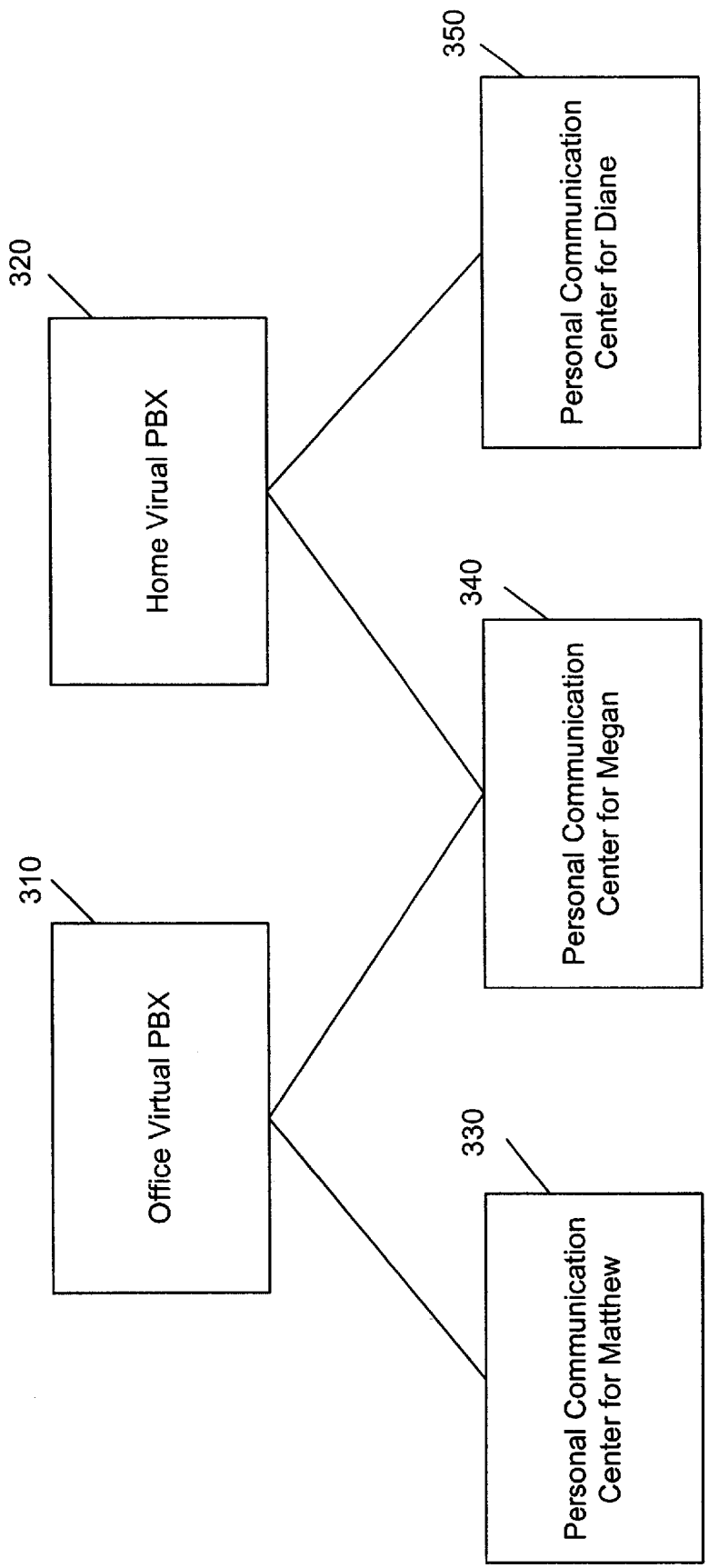
FIG. 3 is a block diagram illustrating PCCs connected to multiple VPBXs.

FIG. 3 illustrates relationship between various VPBXs and various PCCs. The different VPBXs 310 and 320 (office and home, for example) may be linked to different individuals or the same individual. For example, VPBX 310 is linked to both the PCC for Matthew 330 and the PCC for Megan 340. In this example, the VPBX 310 may query a caller using a touch-tone menu, for example, as to whether he or she would like to communicate with either Matthew or Megan. The caller may either be connected to Matthew or Megan, leave a voice mail, be forwarded, etc.

The PCCs may also be connected to one or more VPBX. For example, the PCC for Megan 340 is linked to her office VPBX 310 and her home VPBX 320. Therefore, callers attempting to contact her from her office or her home will be routed to her PCC 340. From her PCC 340, other known or future developed services may used to locate Megan or serve as a central message center, for example.

Figure 4:
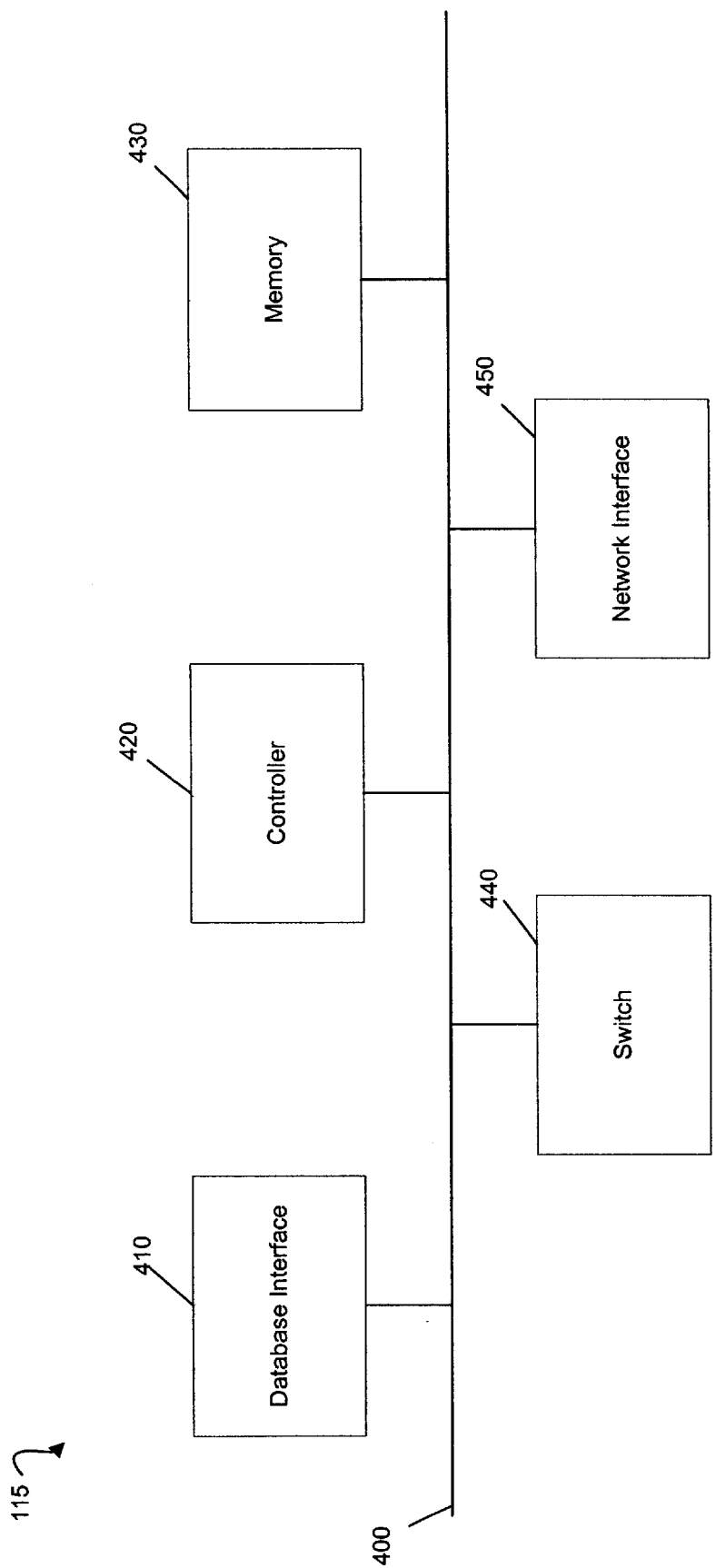
FIG. 4 is an exemplary block diagram of a VPBX.

FIG. 4 is an exemplary block diagram of the VPBX 115. The VPBX 115 includes a controller 410, a network interface for 450, a memory 430, a database 410, and a switch 440. The above components are coupled together through a control/signal bus 400. While FIG. 4 shows a bus architecture, other hardware configurations may also be possible, as is known to one skilled in the art. Furthermore, the functions performed by the components shown in FIG. 4 may be combined or may be further divided among specific processors, such as digital signal processors and/or performed by dedicated hardware, such as application-specific integrated circuits (ASIC) or other hardware implementations, such as PLAs, PALs or PLD's, for example.

The VPBX 115 may include one or more internal databases stored in memory 430. Alternatively, the VPBX 115 may be coupled to one or more external databases via the database interface 410.

The communication signal routing may be performed by a switch 440, which represents any switch now known or developed in the future, such as the Lucent Technologies, Inc. 5ESS. and 4ESS switches, for example, which are generally known in the art. For ease of discussion, we will assume that the switch 440 performs the necessary switching functions between the network 110 and the PCCs as a result of commands from the controller 410.

Figure 6:
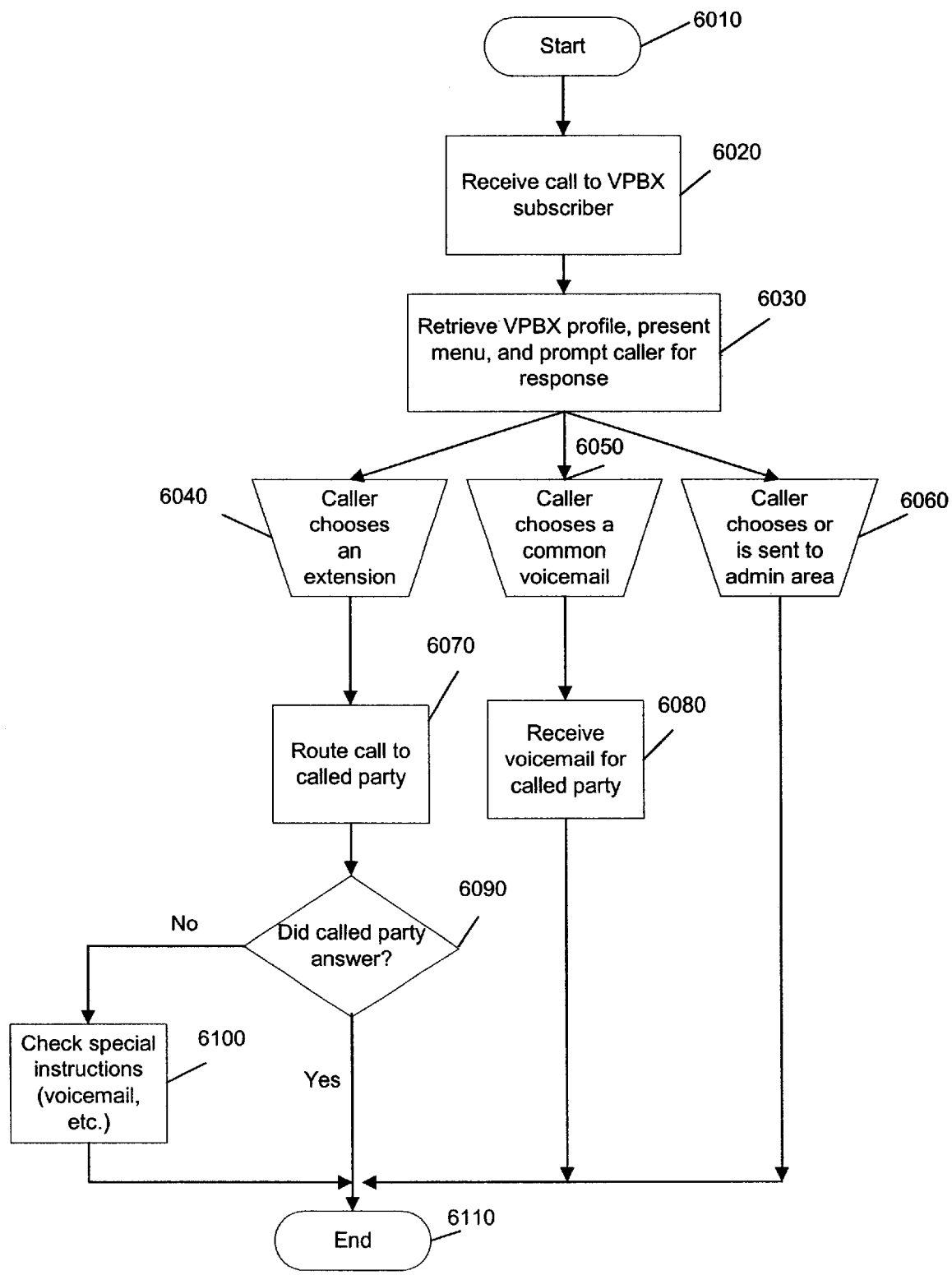
FIG. 6 is a flowchart of an exemplary VPBX process.

An exemplary VPBX system process will now be described with reference to FIGS. 4–6. In FIG. 6, the process begins at step 6010 and proceeds to step 6020 where the controller 420 receives a call for a VPBX subscriber. At step 6030, the controller retrieves the subscriber's VPBX profile from the memory 430 or from external database for database interface 410.

FIG. 5 shows the exemplary VPBX profile 500 for the Jones household. As shown, the Jones household may have one or more phone numbers attached to it. The names of the individuals in the Jones household 510 are assigned specific extension numbers 520. In particular, Matthew is assigned extension 1 and Megan is assigned extension 2. In this regard, when a caller attempts to contact the Jones household, he or she is presented with a menu, for example. The menu may be in any manner known to one skilled in the art, such as a touch-tone, voice recognition, interactive voice response, text, touch screen, etc. The menu may prompt the caller to choose between several possible options, including choosing between various, extensions, such as those shown representing Matthew and Megan, leaving a voice mail in a common voice mailbox, or being transferred to an administrator, receptionist or directory, for example.

As shown in FIG. 6, three examples of choices the caller may make are given. In particular, step 6040 shows a possible path where the caller chooses an extension, (i.e., chooses extensions 1 or 2 for Matthew or Megan, respectively). If the caller chooses the extension for Matthew, for example, then in step 6070, the controller 420 directs switch 440 to route the caller to extension 1. In step 6090, the controller 420 monitors whether the called party answers. If the called party answers the call (goes "off-hook"), the process proceeds to step 6110 and ends.

Otherwise, if the called party does not answer, in step 6100, the controller 420 checks for any special instructions in the PCC configuration 530 in the Jones household profile 500 for Matthew. For example, the PCC configuration 530 for Matthew indicates that calls should be forwarded to his pager and that his voice mail is off. Therefore, the controller 420 will attempt to contact Matthew via his pager through the network interface 450. On the other hand, Megan's PCC configuration 530 indicates that her Find me system is off and her voice mail is on. Therefore, when calls are received for Megan and she does not answer, the controller 420 will prompt caller to leave a message on Megan's voice mail system.

Alternatively, in step 6050, the caller may choose to leave a message in the common voice mail as opposed to choosing extension. If the caller chooses the voice mail option, the process proceeds to step 6080 where the controller 420 receives the caller's message in stores the message in the memory 430 or in an external database through the database interface 410. The process then goes to step 6110 and ends.

As another possible option, a caller may choose to or be sent to administrative area in step 6060. The administrative area may default to a receptionist, a directory, a series recorded messages, additional layers of menus, alternative phone numbers, etc. Once the caller has been sent to the administrative area, the process goes to step 6110 and ends.

The VPBX 115 may also be configured to recognize facsimile signals using any known facsimile signal recognition device, such as a 2100 Hz tone detector, for example. Once the facsimile signal is recognized, the controller 420 checks the subscriber's profile to determine how the subscriber has designated how to handle facsimile transactions, including to which machine they are to be directed.

The VPBX 115 of the invention may provide the subscriber a variety of flexible communication options. Subscribers may be able to add, change in release extensions from their VPBX profile, as well as change their PCC configuration. For example, members of a VPBX subscriber household, may be able to access their extension and group messages from other locations, have messages or calls forwarded to another phone number or VPBX, activate Ward T. activate voice mail and Find-me systems, set up or change the VPBX greeting, etc.

Callers may also be provided additional options, such as leaving a message for the entire household, leaving a message for one member of the household, speaking to the first person answers, choosing to be forwarded to another number, choosing to "find" the called party, etc.

As shown in FIG. 4, the method of this invention is preferably implemented on a programmed processor. However, the VPBX 115 can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device on which the finite state machine capable of implementing the flowchart shown in FIG. 6 can be used to implement the VPBX 115 functions of this invention.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

What is claimed is:

1. A method for establishing communications between a first party and a second party in a network, the second party being a member of a group that includes more than one member, and the members of the group being associated with a same first communications address, comprising:

receiving a signal from the first party to initiate communications with the second party at the first communications address;

retrieving a profile for the first communications address from a database, the profile containing communications information for each member of the group, wherein each member of the group is associated with one or more second communications addresses, each of the second communications addresses being associated with one or more communications options, wherein one of the communications options is designated as a preferred communications option;

prompting the first party to select one of the second communications addresses;

sensing the status of each member's preferred communications option;

when the preferred communications option is unavailable, selecting another communications option according the members profile and updating the members profile information according to changes in the status; and the first party to the second party based on the second party's communications options.

2. The method of claim 1, wherein the first communications address is a telephone number.

3. The method of claim 2, wherein the second communications addresses are extensions associated with the telephone number.

4. The method of claim 1, wherein the profile includes communications instructions for each member of the group.

5. The method of claim 4, wherein the communications instructions include status information concerning the members' communications devices and services.

6. The method of claim 5, wherein each member may change the status information of their communications devices and services.

7. The method of claims 1, wherein one of the communications options is to leave a voice mail message.

8. The method of claim 7, wherein the voice mail message is directed to a voice mailbox for the second party.

9. The method of claim 7, wherein the voice mail message is directed to a voice mailbox for all of the members of the group.

10. The method of claim 1, wherein one of the communications options is to be connected to one of a receptionist, a recording, a directory, an operator, and an information provider.

11. The method of claim 1, further comprising recognizing whether a communication is a facsimile transmission, wherein if a facsimile transmission is recognized, processing the facsimile transmission according to the profile.

12. The method of claim 1, wherein the members of the group may be added or deleted.

13. The method of claim 1, wherein the second party's second communications address also being associated with a third communications address.

14. The method of claim 1, further comprising receiving a from the third communications address, the third communications address having received a signal from a third party attempting to communicate with the second party.

15. A virtual private branch exchange system that establishes communications between a first party and a second party in a network, the second party being a member of a group that includes more than one member, and the members of the group being associated with a same first communications address, comprising:

a memory;

a network interface coupled to the network; and a controller coupled to the memory and the network interface, that receives a signal from the first party to initiate communications with the second party at the first communications address, retrieving a profile for the first communications address from a database, the profile containing communications information for each member of the group, wherein each member of the group is associated with one or more second communications addresses, each of the second communications addresses being associated with one or more communications options, wherein one of the communications options is designated as a preferred communications option, prompts the first party to select one of the second communications addresses, senses the status of each member's preferred communications option, selects another communications option according the members profile and updates the members profile information according to changes in the status when the preferred communications option is unavailable, and connects the first party to the second party based on the second party's communications options.

16. The system of claim 15, wherein the first communications address is a telephone number.

17. The system of claim 16, wherein the second communications addresses are extensions associated with the telephone number.

18. The system of claim 15, wherein the profile includes communications instructions for each member of the group.

19. The system of claim 16, wherein the communications instructions include status information concerning the members' communications devices and services.

20. The system of claim 19, wherein each member may change the status information of their communications devices and services.

21. The system of claim 15, wherein one of the communications options is to leave a voice mail message.

22. The system of claim 21, wherein the voice mail message is directed to a voice mailbox for the second party.

23. The system of claim 21, wherein the voice mail message is directed to a voice mailbox for all of the members of the group.

24. The system of claim 15, wherein one of the communications options is to be connected to one of a receptionist, a recording, a directory, an operator, and an information provider.

25. The system of claim 23, wherein the controller recognizes whether a communication is a facsimile transmission, wherein if a facsimile transmission is recognized, the controller processes the facsimile transmission according to the profile.

26. The system of claim 15, wherein the members of the group may be added or deleted.

27. The system of claim 16, wherein the second party's second communications address also being associated with a third communications address.

28. The system of claim 16, wherein the controller receives a signal from the third communications address, the third communications address having received a signal from a third party attempting to communicate with the second party.

29. A virtual private branch exchange system that establishes communications between a first party and a second party in a network, the second party being a member of a group that includes more than one member, and the members of the group being associated with a same first communications address, comprising:

a memory;

a network interface coupled to the network; and a controller coupled to the memory and the network interface, that receives a signal from the first party to initiate communications with the second party at the first communications address, retrieving a profile for the first communications address from a database, the profile containing communications information for each member of the group, wherein each member of the group is associated with one or more second communications addresses, each of the second communications addresses being associated with one or more communications options, wherein one of the communications options is designated as a preferred communications option, prompts the first party to select one of the second communications addresses, senses the status of each member's preferred communications option, selects another communications option according the members profile and updates the members profile information according to changes in the status when the preferred communications option is unavailable, and connects the first party to the second party based on the second party's communications options, wherein the communications options include leaving a voice mail message directed to the second party's voice mailbox, a voice mail message directed to a voice mailbox for all of the members of the group, being connected to one of a receptionist, a recording, a directory, an operator, and an information provider, the controller recognizing whether communications is a facsimile transmission, wherein if the facsimile transmission is recognized, the controller processes the facsimile transmission according to the profile.

* * * * *

UNITED STATES PATENT AND TRADEMARK OFFICE
CERTIFICATE OF CORRECTION

PATENT NO. : 6,587,555 B1
DATED : July 1, 2003
INVENTOR(S) : Cripe et al.

It is certified that error appears in the above-identified patent and that said Letters Patent is hereby corrected as shown below:

Title page,
Item [57], ABSTRACT,
Line 7, should read -- number, there are extension numbers, and any instructions --
Line 17, should read -- the VBPX connects the call. If the called party does not --

Column 1,
Line 14, should read -- variety of communication services. However, in situations --
Line 45, should read -- the VBPX connects the call. If the called party does not --

Column 2,
Lines 5-6, should read -- 130, 135, 140, 145 can lead to people, devices, services, other VPBXs, and the like. --
Line 13, should read -- VPBXs 115 and 120 and the PCCs 125, 130, 135, 140, and --
Line 20, should read -- be connected to one or more terminals. The terminals 155 may represent --

Column 3
Line 3, should read -- implementations, such as PLAs, PALs or PLDs, for --
Line 12, should read -- Inc. 5ESS and 4ESS switches, for example, which are --
Line 37, should read -- choosing between various extensions, such as those shown --

Column 4,
Line 1, should read -- receives the caller's message and stores the message in the --
Line 6, should read -- area may default to a receptionist, a directory, a series of --
Line 25, should read -- T. activate voice mail and Find-me systems, set up or change --
Line 30, should read -- person who answers, choosing to be forwarded to another --

Column 5,
Lines 10-11, should read -- option according to the member's
                            the member's profile information according to --
Line 13, should read -- connecting the first party to the second party based on the second --
Line 28, should read -- 7. The method of claim 1, wherein one of the commu- --
Line 46, should read -- second communications address is also associated with --

UNITED STATES PATENT AND TRADEMARK OFFICE
CERTIFICATE OF CORRECTION

PATENT NO.   : 6,587,555 B1
DATED        : July 1, 2003
INVENTOR(S)  : Cripe et al.

It is certified that error appears in the above-identified patent and that said Letters Patent is hereby corrected as shown below:

Column 5, cond't,
Lines 48-49, should read -- 14. The method of claim 13, further comprising receiving a signal from the third communications address, the third commu- --

Column 6,
Lines 8-9, should read -- selects another communications option according to the member's profile and updates the member's profile infor- --
Line 21, should read -- 19. The system of claim 18, wherein the communications --
Line 38, should read -- 25. The system of claim 15, wherein the controller rec- --
Lines 45-46, should read -- 27. The system of 15, wherein the second party's second communications address is also associated with --
Line 48, should read -- 28. The system of claim 27, wherein the controller --

Column 7,
Lines 9-10, should read -- selects another communications option according to the member's profile and updates the member's profile infor- --

Column 8,
Line 8, should read -- whether a communication is a facsimile transmission --

Signed and Sealed this

Second Day of November, 2004

JON W. DUDAS
*Director of the United States Patent and Trademark Office*